US012403986B1

(12) United States Patent
DeLuca et al.

(10) Patent No.: US 12,403,986 B1
(45) Date of Patent: Sep. 2, 2025

(54) MARINE VESSELS AND CONVERTIBLE WINDSHIELD APPARATUSES FOR MARINE VESSELS

(71) Applicant: Brunswick Corporation, Mettawa, IL (US)

(72) Inventors: Fabrizio DeLuca, Port Orange, FL (US); John E. Barbier, Port Orange, FL (US); Noah S. Esham, Edgewater, FL (US)

(73) Assignee: Brunswick Corporation, Mettawa, IL (US)

( * ) Notice: Subject to any disclaimer, the term of this patent is extended or adjusted under 35 U.S.C. 154(b) by 686 days.

(21) Appl. No.: 17/743,144

(22) Filed: May 12, 2022

(51) Int. Cl.
*B63B 17/02* (2006.01)
*E05F 15/60* (2015.01)

(52) U.S. Cl.
CPC .............. *B63B 17/02* (2013.01); *E05F 15/60* (2015.01); *E05Y 2201/434* (2013.01); *E05Y 2201/626* (2013.01); *E05Y 2900/514* (2013.01); *E05Y 2900/55* (2013.01)

(58) Field of Classification Search
CPC ......... B63B 17/00; B63B 17/02; B63B 19/00; B63B 19/02; B63B 19/18; E05F 1/00; E05F 1/08; E05F 1/16; E05F 15/60; E05Y 2900/514; E05Y 2900/55; E05Y 2201/434; E05Y 2201/626
USPC .......................................................... 114/361
See application file for complete search history.

(56) References Cited

U.S. PATENT DOCUMENTS

| | | | | |
|---|---|---|---|---|
| 3,161,895 | A * | 12/1964 | Lewis | B63B 19/00 114/361 |
| 7,144,061 | B1 | 12/2006 | Behm et al. | |
| 9,233,734 | B2 * | 1/2016 | Erskine | B63B 19/02 |
| 9,688,363 | B1 | 6/2017 | Marshall et al. | |
| 10,800,494 | B2 | 10/2020 | Deal | |
| 2018/0072386 | A1 | 3/2018 | Dube | |

OTHER PUBLICATIONS

Declaration of Prior Art signed by the Inventors.

* cited by examiner

*Primary Examiner* — Lars A Olson
(74) *Attorney, Agent, or Firm* — Andrus Intellectual Property Law, LLP

(57) ABSTRACT

A marine vessel has a hull with a bow, a stern, starboard and port sides, a deck on the hull, and a console located on the deck between the starboard side and the port side and between the bow and the stern. The console has a helm for the marine vessel and a console windshield which shields the helm from wind. A cover extends over the helm. An auxiliary windshield is coupled to the cover, the auxiliary windshield being movable into and between a stowed position in which the auxiliary windshield is stowed in the cover and a deployed position in which the auxiliary windshield extends downwardly from the cover into a gap between the console and one of the starboard side and the port side.

26 Claims, 9 Drawing Sheets

MARINE VESSELS AND CONVERTIBLE WINDSHIELD APPARATUSES FOR MARINE VESSELS

FIELD

The present invention relates to marine vessels and to convertible windshield apparatuses for marine vessels.

BACKGROUND

The following U.S. Patents are incorporated herein by reference.

U.S. Pat. No. 7,144,061 discloses a retractable windshield and collapsible console apparatus which can be raised and the windshield extended when needed to afford additional protection to persons from conditions due to environment, and to allow for convenient and safe stowing of the apparatus in the same location without causing an obstruction. The console can be collapsed and stowed into a position which is substantially parallel relative to a base on the floor or other surface of a boat, other vehicle or other structure when not in use.

U.S. Pat. No. 9,688,363 discloses an improved walk-through door for a marine vessel comprising a curved roof with a windshield disposed in the curved roof proximate a foredeck of the marine vessel. A transparent walkthrough door is slidably mounted in the curved roof and moveable between a closed position, whereat the walkthrough door seals with the foredeck and an open position permitting access to the foredeck. Preferably, the walkthrough door is electrically operated.

U.S. Pat. No. 10,800,494 discloses an exemplary windshield assembly for a marine vessel including a plurality of first extrusions arranged vertically; a plurality of second extrusions, wherein each second extrusion is a crossbar arranged between a pair of first extrusions; and an opening formed between each pair of second extrusions connected between a common pair of first extrusions, wherein each opening includes a plurality of receivers formed for framing a panel, the plurality of receivers formed on a surface of each first extrusion and each second extrusion of a respective opening, and wherein a front opening includes an upper second extrusion and movable front panel, the movable front panel being connected to rotate about the upper second extrusion for venting.

SUMMARY

This Summary is provided to introduce a selection of concepts which are further described below in the Detailed Description. This Summary is not intended to identify key or essential features of the claimed subject matter, nor is it intended to be used as an aid in limiting the scope of the claimed subject matter.

A marine vessel has a hull with a bow, a stern, starboard and port sides, a deck on the hull, and a console located on the deck between the starboard side and the port side and between the bow and the stern. The console has a helm for the marine vessel and a console windshield which shields the helm from wind. A cover extends over the helm. An auxiliary windshield is coupled to the cover, the auxiliary windshield being movable into and between a stowed position in which the auxiliary windshield is stowed in the cover and a deployed position in which the auxiliary windshield extends downwardly from the cover into a gap between the console and one of the starboard side and the port side.

In non-limiting examples, the auxiliary windshield is pivotably coupled to the cover. In the stowed position, the auxiliary windshield is nested in a recess in the cover. In the deployed position the auxiliary windshield and the console windshield together provide a weathertight barrier for the console and the gap.

In non-limiting examples, an actuator is configured to move the auxiliary windshield into the stowed position and into the deployed position. In the deployed position the auxiliary windshield spans an upper portion of the gap.

In non-limiting examples, a wind door is movable into and between a retracted position and an extended position in which the wind door spans a lower portion of the gap. the wind door is pivotably coupled to one of the hull and the console. Moving the auxiliary windshield into the deployed position and moving the wind door into the extended position provides a weathertight barrier for the helm and the gap between the cover and the deck.

In non-limiting examples, the auxiliary windshield is one of starboard and port auxiliary windshields which in the deployed position and together with the console windshield provide a weathertight barrier extending from the starboard side to the port side. The gap is one of starboard and port gaps, and the starboard and port auxiliary windshields span an upper portion of the starboard and port gaps, respectively. Starboard and port wind doors are movable into and between a retracted position and an extended position in which the starboard and port wind doors span a lower portion of the starboard and port gaps, respectively, so that together the console, the starboard and port auxiliary windshields, and the starboard and port wind doors provide a full width weathertight barrier extending from the starboard side to the port side and from the deck to the cover.

In non-limiting examples, a pivot assembly pivotably couples an upper end of the auxiliary windshield to the cover along a pivot axis. The pivot assembly has an upper actuator which pivots the auxiliary windshield into the stowed position and into the deployed position. The upper actuator for example can be a linear actuator coupled to the auxiliary windshield by a rocker arm.

In non-limiting examples, the pivot assembly further has a pivot bracket which is fixedly coupled to the auxiliary windshield. Extension and retraction of the linear actuator pivots the pivot bracket and auxiliary windshield about the pivot axis. The cover comprises a window frame and the pivot bracket comprises a curved outer surface which remains adjacent to the window frame as the auxiliary windshield is pivoted about the pivot axis into and between the stowed position and the deployed position. A wiper seal on the window frame, wherein the curved outer surface slides along the wiper seal as the auxiliary windshield is pivoted about the pivot axis.

In non-limiting examples, a lower actuator couples a lower end of the auxiliary windshield to the console and to the hull in the deployed position. The lower actuator comprises a linear actuator which is retained in the lower end of the auxiliary windshield, the lower actuator being movable into an active position which engages the lower end of the auxiliary windshield with the console and with the hull, and an inactive position which disengages the lower end of the auxiliary windshield from the console and the hull.

In non-limiting examples, a convertible windshield apparatus for a marine vessel comprises a cover having a recess, an auxiliary windshield being movable into and between a stowed position in which the auxiliary windshield is nested in the recess and a deployed position in which the auxiliary windshield is at least partially out of the recess, and a pivot assembly which pivotably couples the auxiliary windshield to the cover along a pivot axis. The pivot assembly comprises an actuator and a pivot bracket which is fixedly coupled to the auxiliary windshield, wherein the actuator pivots the pivot bracket and auxiliary windshield about the pivot axis.

BRIEF DESCRIPTION OF THE DRAWINGS

The present disclosure includes the following Figures.

DETAILED DESCRIPTION

Figure 1:
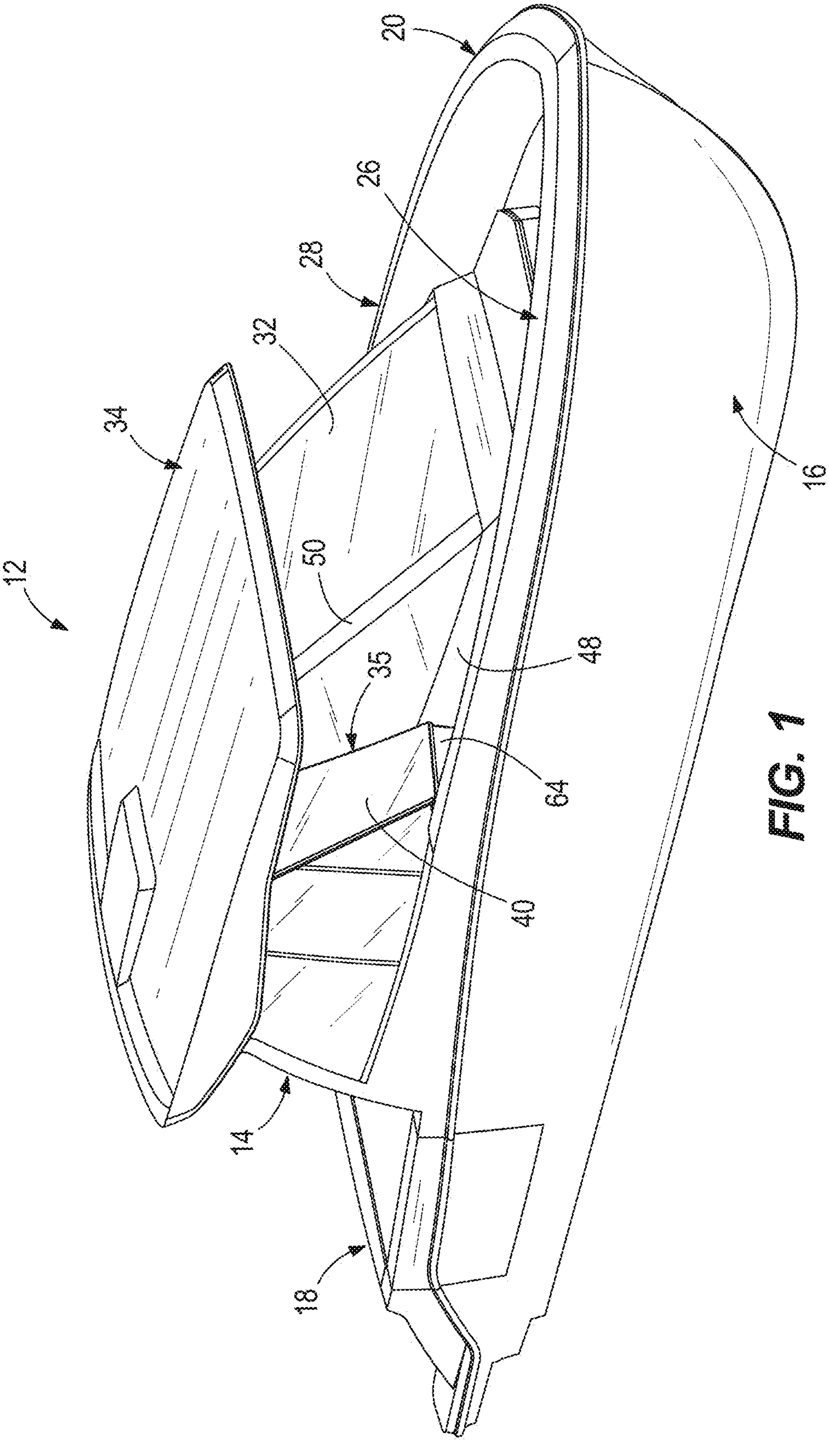
FIG. 1 is a perspective view of a marine vessel having a convertible, full width weathertight windshield apparatus.
Figure 2:
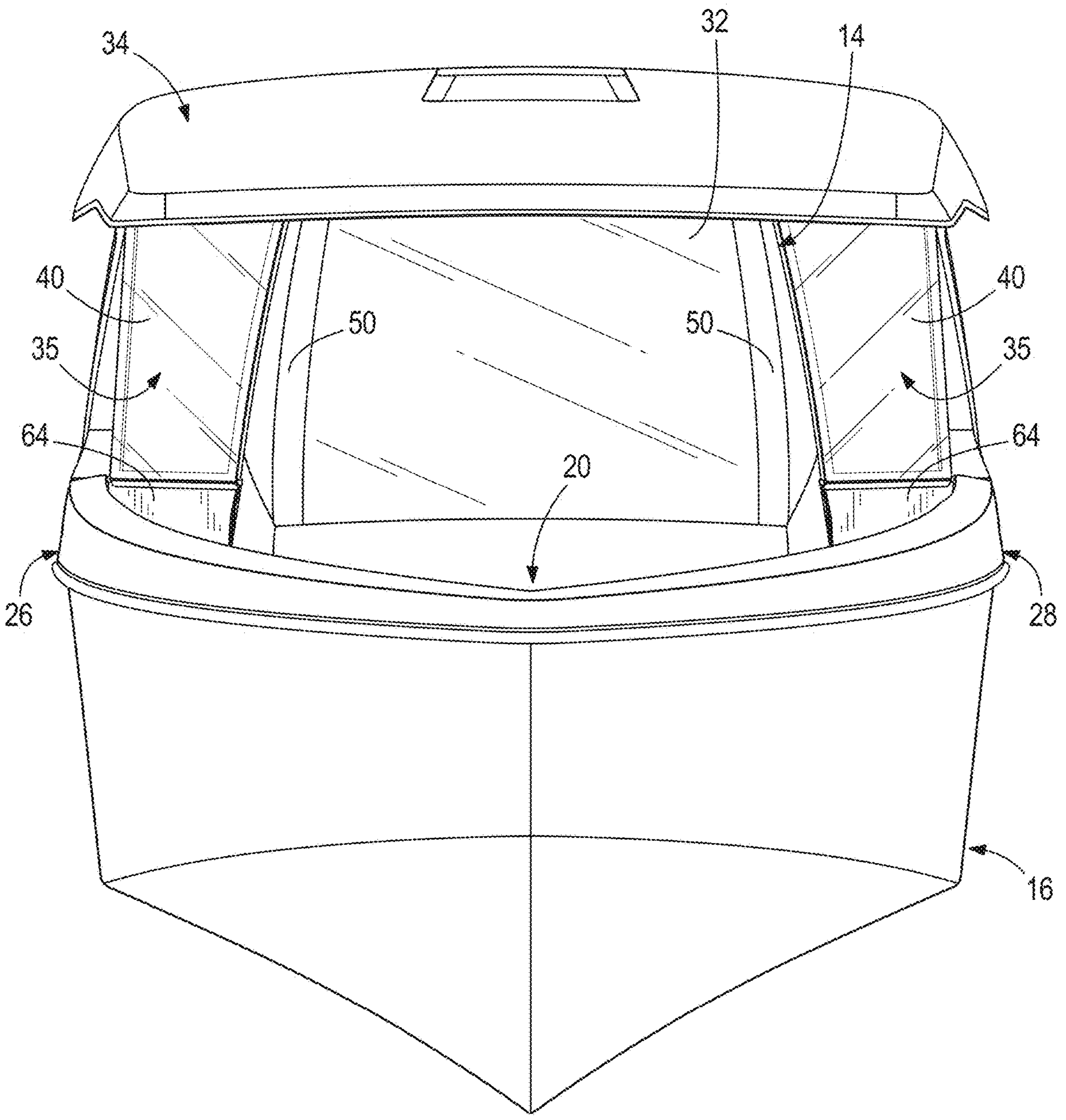
FIG. 2 is a front view of the marine vessel illustrated in FIG. 1.

FIGS. 1-2 illustrate a marine vessel 12 comprising a hull 16 having a bow 20, a stern 18, a starboard side 26 and a port side 28. The marine vessel 12 extends from the bow 20 to the stern 18 in a longitudinal direction X, from the starboard side 26 to the port side 28 in a lateral direction Y which is perpendicular to the longitudinal direction X, and from a top to a bottom in a vertical direction Z which is perpendicular to the longitudinal direction X and lateral direction Y.

The marine vessel 12 further comprises a deck 24 (FIG. 6), a console 14 on the deck 24, and a cover 34. The console 14 is located laterally between the starboard side 26 and the port side 28 and longitudinally between the bow 20 and the stern 18. The cover 34 is positioned over the top of the console 14 and extends laterally from the starboard side 26 to the port side 28, and longitudinally over the top of the helm provided at the console 14. Port and starboard gaps 35 or walkways are defined laterally between the console 14 and the starboard side 26 and the port side 28, respectively, and extend vertically from the deck 24 to the cover 34. The gaps 35 provide walkways for a passenger to walk back and forth on the deck 24 from the bow 20 to the stern 18, on both sides of the console 14.

The console 14 provides the helm at which an operator can control operation of the marine vessel 12. A console windshield 32 wraps around the console 14 on top of the sidewalls 48 of the console 14, opening toward the stern 18 and thus shielding passengers located at the helm from wind and other environmental conditions. Support pillars 50 extend generally vertically upwardly and provide support for the panes of the console windshield 32. The support pillars 50 taper laterally inwardly toward the center of the marine vessel 12, as illustrated in FIG. 2.

During research and experimentation, the present inventors have realized a need for improved weather barriers for marine vessels having a center console. Marine vessels having center consoles typically lack a full width windshield extending from the starboard side 26 to the port side 28. In such arrangements, it is known to provide "walk-around functionality" about the center console however providing this functionality typically hinders the ability to provide a full vessel beam weather protection to occupants located at the rear of the vessel. As such, typically only occupants seated at the helm directly behind the center console windshield are protected via the console windshield 32 from the elements. The present inventors have realized a desirability of providing improved apparatuses having convertible, automatically deployable auxiliary windows, for example which hinge downwardly from the vessel's cover into a deployed position. This maintains the walk-around functionality while alternately efficiently providing a full width weathertight barrier which completely extends from the starboard side 26 to the port side 28. The present inventors have also realized a desirability of providing such auxiliary windshields which are advantageously configured to nest entirely within the cover 34 when stowed, providing both aesthetically pleasing and aerodynamic advantages.

Figure 3:
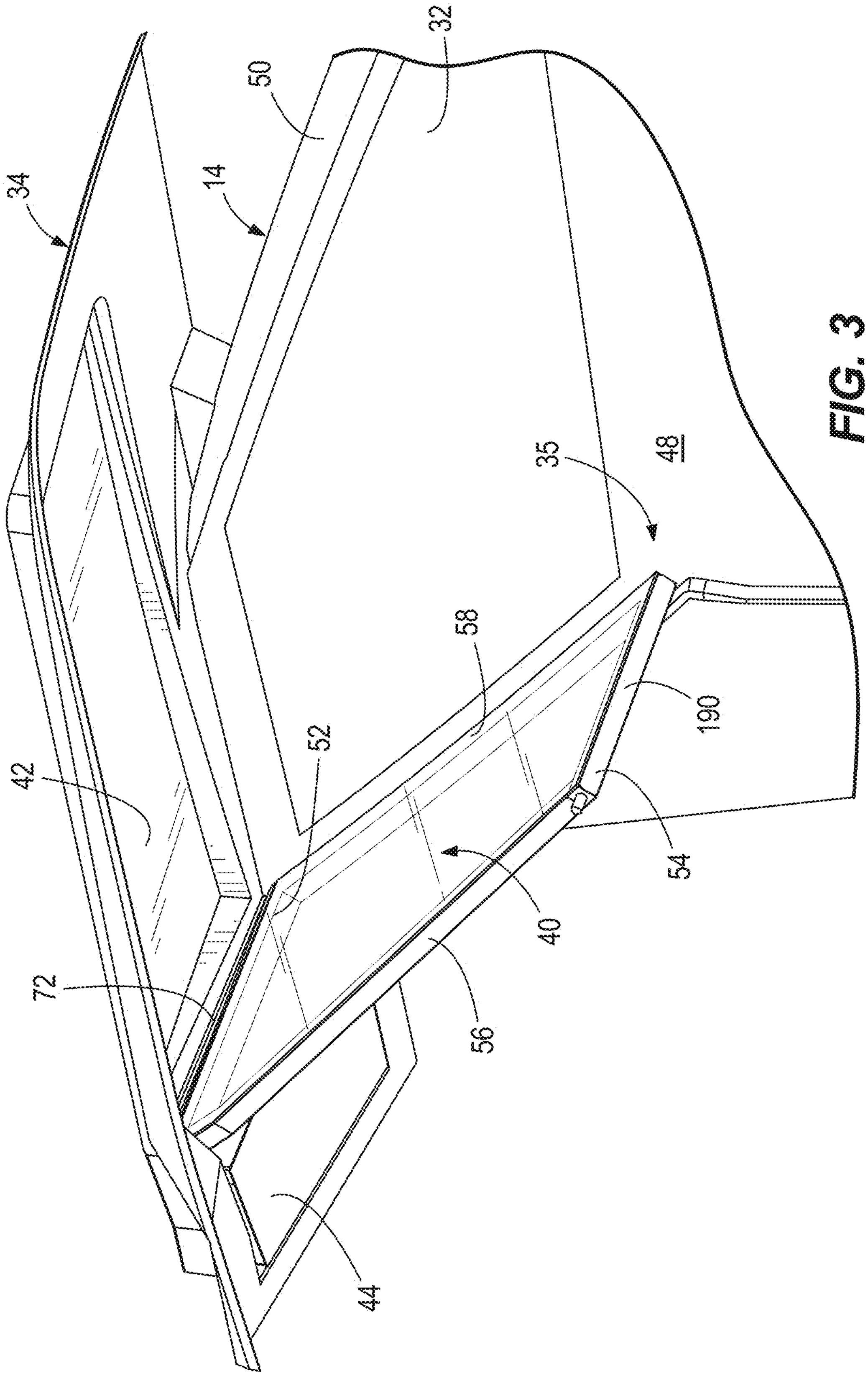
FIG. 3 is a starboard side perspective view of a cover and an auxiliary windshield of the windshield apparatus in a deployed position.
Figure 4:
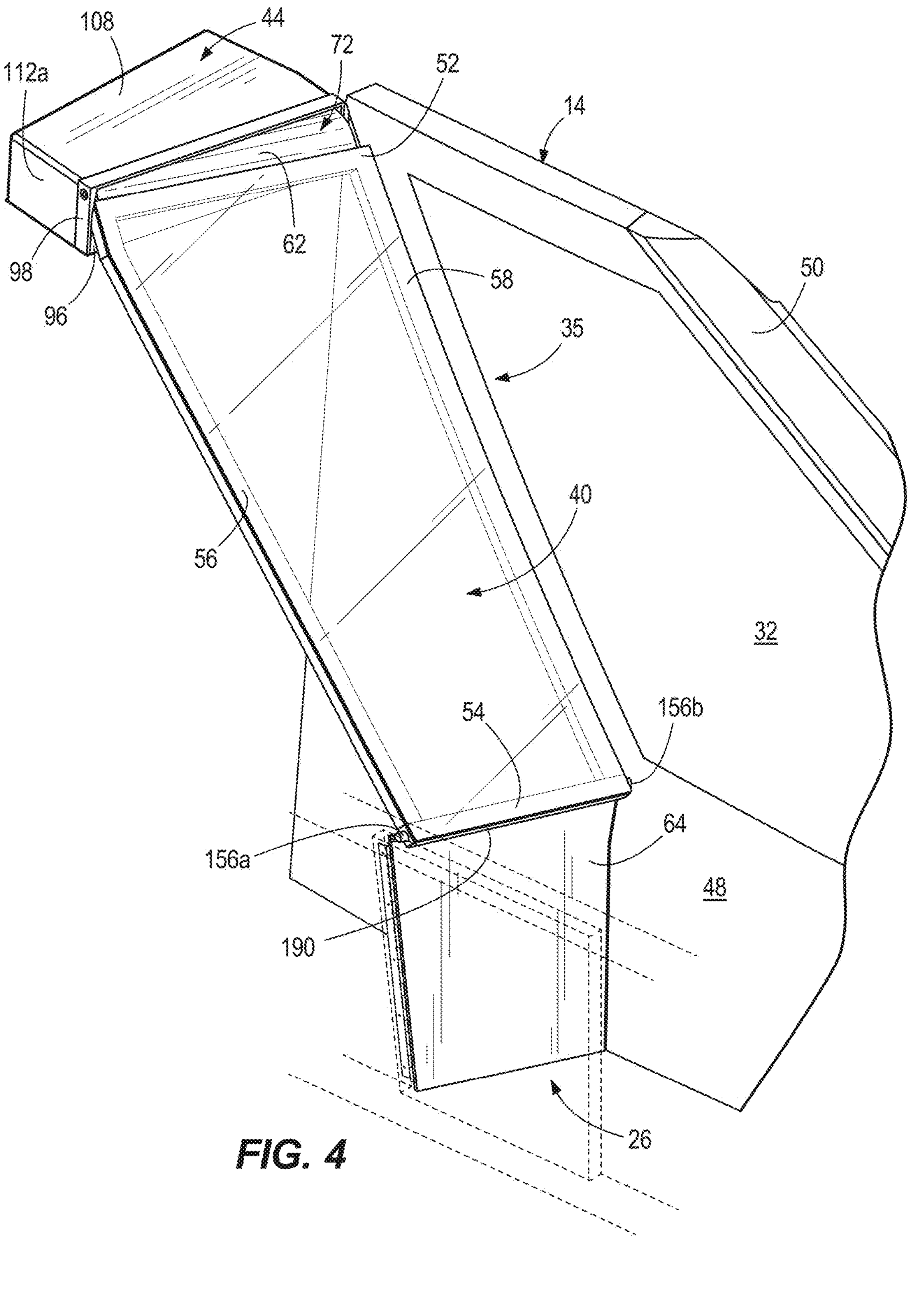
FIG. 4 is another starboard side perspective view of the cover and the auxiliary windshield and a wind door in the deployed position.

Referring to FIGS. 1-2, the marine vessel 12 includes novel port and starboard auxiliary windshields 40, which in the illustrated example are pivotably coupled to the cover 34 on the starboard and port sides 26, 28, respectively, each being configured to move into and between a stowed position (FIG. 6) and a deployed position (FIGS. 1-5). FIGS. 3-4 are starboard side views of the cover 34 and the starboard side auxiliary windshield 40. The starboard side of the cover 34 and the starboard side auxiliary windshield 40 are mirror images of the port side of the cover 34 and port side auxiliary windshield 40. As such, the following description of the starboard side of the cover 34 and starboard side auxiliary windshield 40 equally applies to the port side of the cover 34 and port side auxiliary windshield 40.

Referring now to FIGS. 3-4, among other things, the cover 34 has an actuator housing 44 and a recess 42 located adjacent to the actuator housing 44. As best viewed in FIGS. 5-7, the actuator housing 44 has an upper face 108, a lower cover plate 110, and a first and second side wall **112*a*, 112*b*. The actuator housing 44 houses a pivot assembly 72 which is fixedly coupled to the auxiliary windshield 40 and closes the open end 96 of the actuator housing 44. As further described herein below, the pivot assembly 72 is configured to pivot the auxiliary windshield 40 into and between the stowed and the deployed positions, and the recess 42 is sized and shaped to efficiently store the auxiliary windshield 40** in the stowed position.

The auxiliary windshield 40 has an upper end 52, a lower end 54, an outer side 56, and an inner side 58. The upper end 52 is pivotably coupled to the pivot assembly 72. The inner side 58 laterally tapers towards the center of the marine vessel 12 as the auxiliary windshield 40 vertically extends from the lower end 54 to the upper end 52. The taper of the inner side 58 follows the taper of the console windshield 32. In the stowed position, the auxiliary windshield 40 is nested within the recess 42 of the cover 34. In a deployed position, the auxiliary windshield 40 extends downwardly from the recess 42 into an upper portion of the gap 35 between the console 14 and the hull 16, advantageously providing a weathertight barrier together with the console windshield 32.

Figure 5:
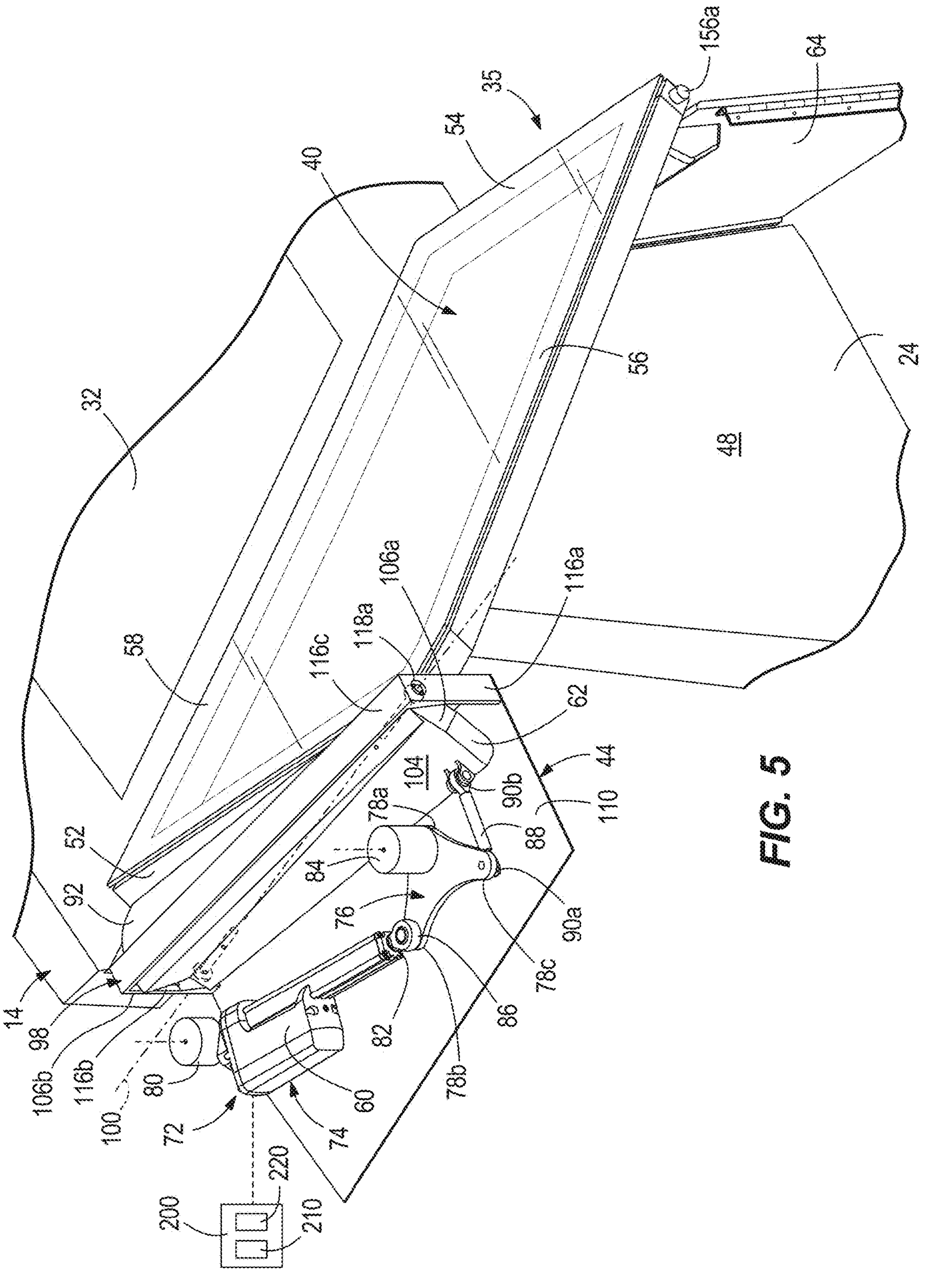
FIG. 5 is a perspective view looking down at a pivot assembly and the auxiliary windshield and the wind door in the deployed position.
Figure 6:
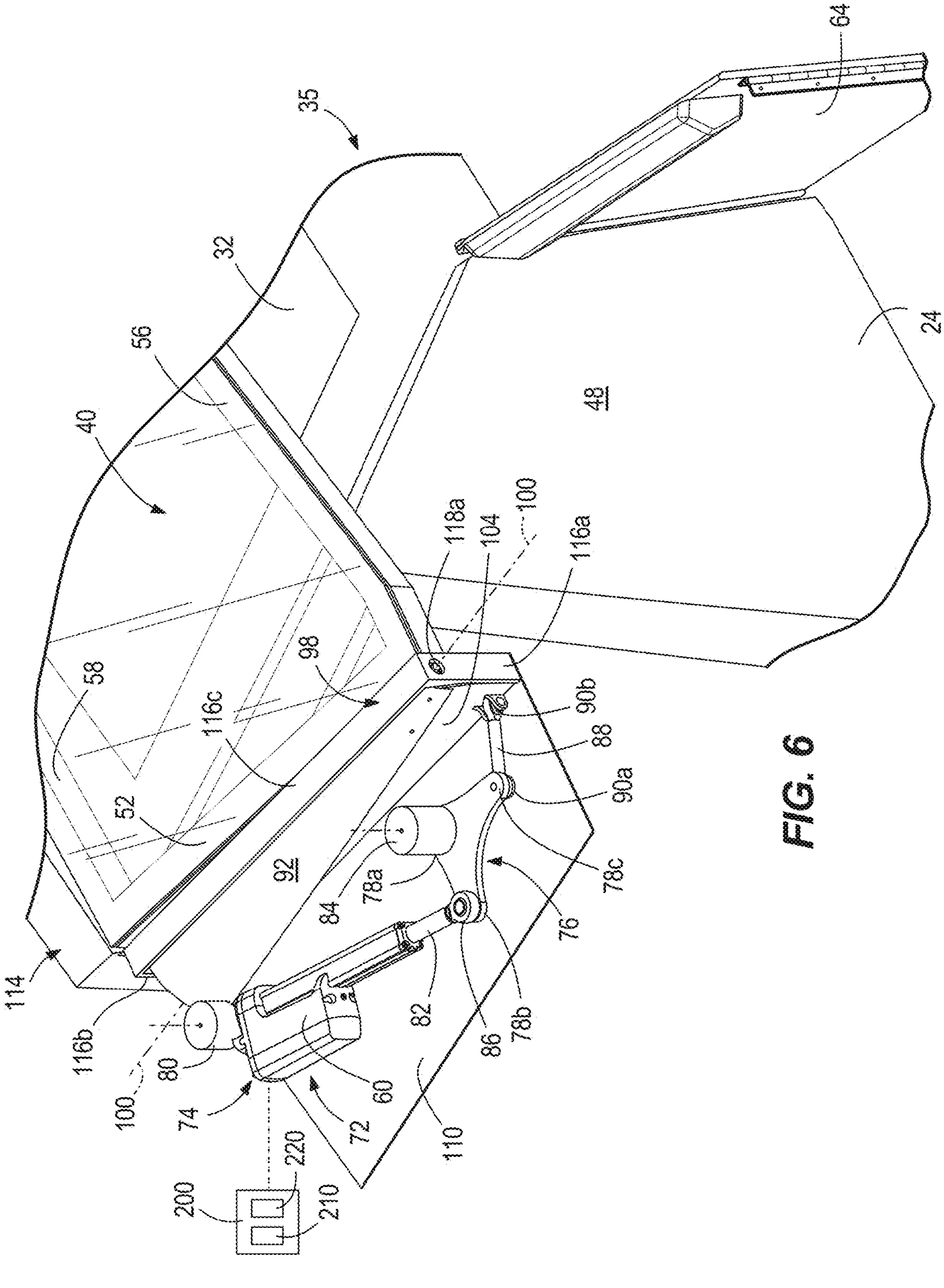
FIG. 6 is a perspective view looking down at the pivot assembly and the auxiliary windshield in the stowed position and the wind door in the deployed position.
Figure 7:
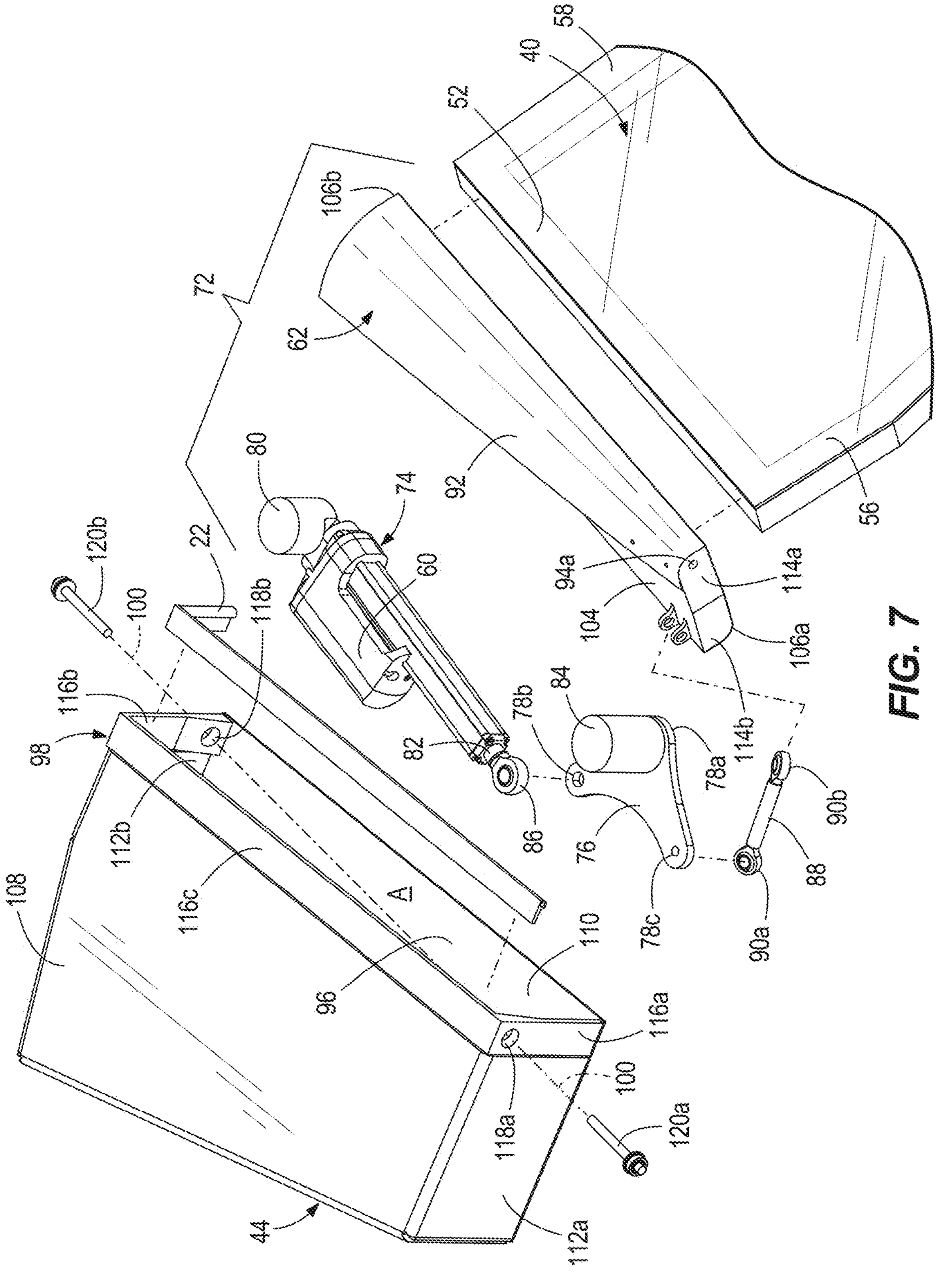
FIG. 7 is an exploded view of a cover body, the pivot assembly, and the auxiliary windshield.

Referring to FIGS. 5-7, the pivot assembly 72 has an upper actuator 74 which is coupled to a pivot bracket 62 via a rocker arm 76. In the illustrated examples, the upper actuator 74 is a linear actuator having a body 60 containing an electric motor and an actuation arm 82. Operation of the electric motor in a first direction extends the actuator arm 82 from the body 60 and operation of the electric motor in an opposite second direction retracts the actuator arm 82 into the body 60. The type and configuration of the upper actuator 74 can vary and can include any suitable conventional electric, hydraulic, or electro-hydraulic actuator. Suitable actuators are available for purchase from Linak. The body 60 of the upper actuator 74 is pivotably coupled to the upper face 108 of the actuator housing 44 via a boss 80. The actuation arm 82 is pivotably coupled to the rocker arm 76 via a heim joint 86. The rocker arm 76 is a generally triangular plate, having three coupling vertices 78*a*, 78*b*, 78*c*. The rocker arm 76 is coupled to the actuator housing 44 at the first coupling vertex 78*a* via a boss 84, coupled to the actuation arm 82 via the heim joint 86 at the second coupling vertex 78*b*, and coupled to the pivot bracket 62 at the third coupling vertex 78*c* via a linkage arm 88. The linkage arm 88 is coupled at a first end to the third coupling vertex 78*c* via a heim joint 90*a* and coupled at an opposite second end to the pivot bracket 62 via a heim joint 90*b*.

The pivot bracket 62 has an elongated body 104, a curved outer surface 92, first and second ends 106*a*, 106*b*, and upper and lower halves 114*a*, 114*b*, which in the illustrated example are formed as one piece. The first and second ends 106*a*, 106*b* have an aperture 94*a*, 94*b*, respectively. The curved outer surface 92 is a semi-conical protrusion extending from the elongated body 104 such that the curved outer surface 92 radially expands from the first end 106*a* to the second end 106*b*, as best illustrated in FIG. 7. The first aperture 94*a* is located on the first end 106*a* on the upper half 114*a*, and second aperture 94*b* is located on the second end 106*b* on the lower half 114*b*, defining a diagonal pivot axis 100 (FIG. 5) about which the pivot bracket 62 rotates.

Referring to FIG. 7, the pivot assembly 72 is pivotably coupled to the actuator housing 44 via a window frame 98 defining the open end 96 of the actuator housing 44. The auxiliary windshield 40 is coupled to the pivot assembly 72 and the actuator housing 44 via the pivot bracket 62. The upper end 52 of the auxiliary windshield 40 aligns with and is fixedly coupled to the elongated body 104 along the diagonal pivot axis 100, such that the auxiliary windshield 40 is pivotable about the diagonal pivot axis 100. The window frame 98 is positioned on top of the cover plate 110 of the actuator housing 44, and configured such that the pivot bracket 62 can be stowed and pivoted within a cross sectional area A defined by the window frame 98.

The window frame 98 has a first side 116*a*, a second side 116*b*, and an upper length 116*c*. Each of the first and second sides 116*a*, 116*b* includes an aperture 118*a*, 118*b*, respectively. The first side 116*a*, the upper length 116*c*, and the second side 116*b* align with the first side wall 112*a*, the upper face 108, and the second side wall 112*b* of the actuator housing 44. The aperture 118*a* of the window frame 98 is aligned with the first aperture 94*a* of the pivot bracket 62 and the aperture 118*b* of the window frame 98 is aligned with the second aperture 94*b* of the pivot bracket 62. The window frame 98 is secured to the pivot bracket 62 via a first and second pin 120*a*, 120*b*, such that the first pin 120*a* extends through the aperture 118*a*, then the first aperture 94*a* and the second pin 120*b* extends through the aperture 118*b* then the second aperture 94*b*. The pins 120*a*, 120*b* are secured to the respective apertures via bearings or bushings and are aligned with one another along the diagonal pivot axis 100. In some examples, the window frame 98 further includes a wiper seal 22 which extends over and across the length of the elongated body 104 and down the second end 106*b* between the window frame 98 and the pivot bracket 62 to provide a sliding watertight seal along the curved outer surface 92 as the auxiliary windshield 40 is pivoted about the diagonal pivot axis 100.

Figure 8:
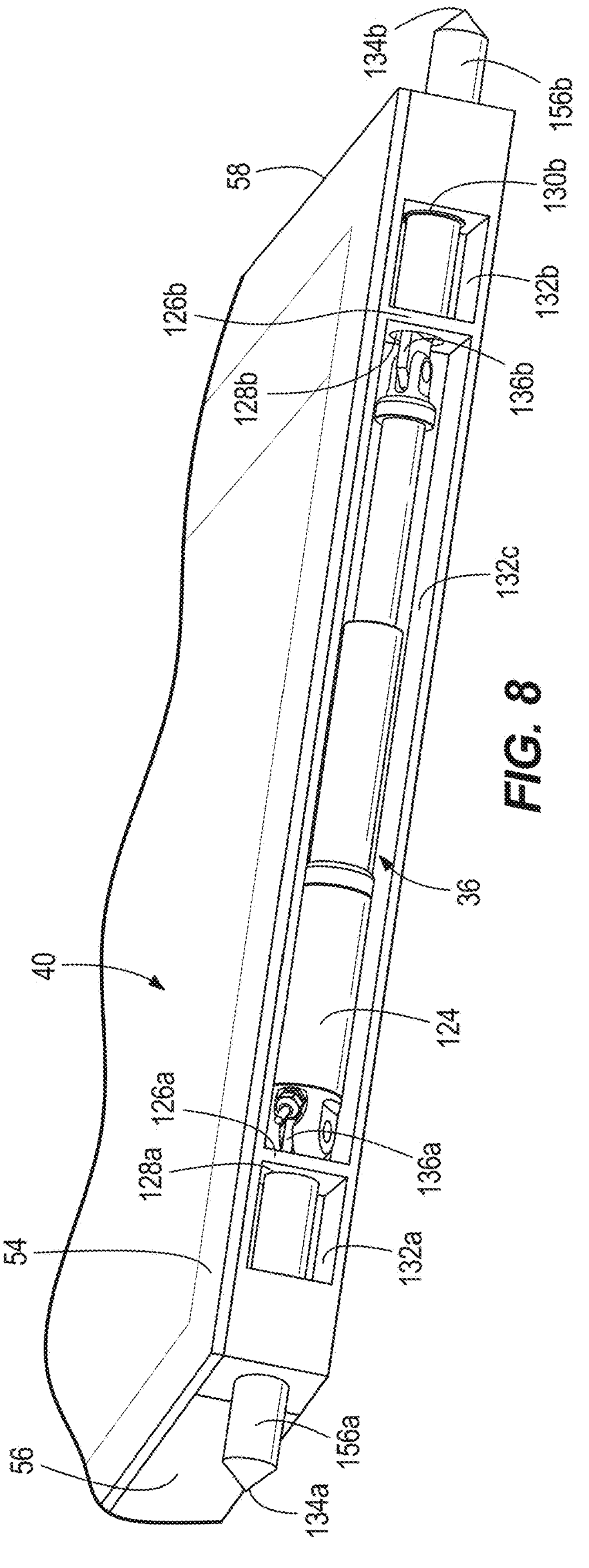
FIG. 8 is a sectional view of a lower end of the auxiliary windshield, illustrating a lower actuator.
Figure 9:
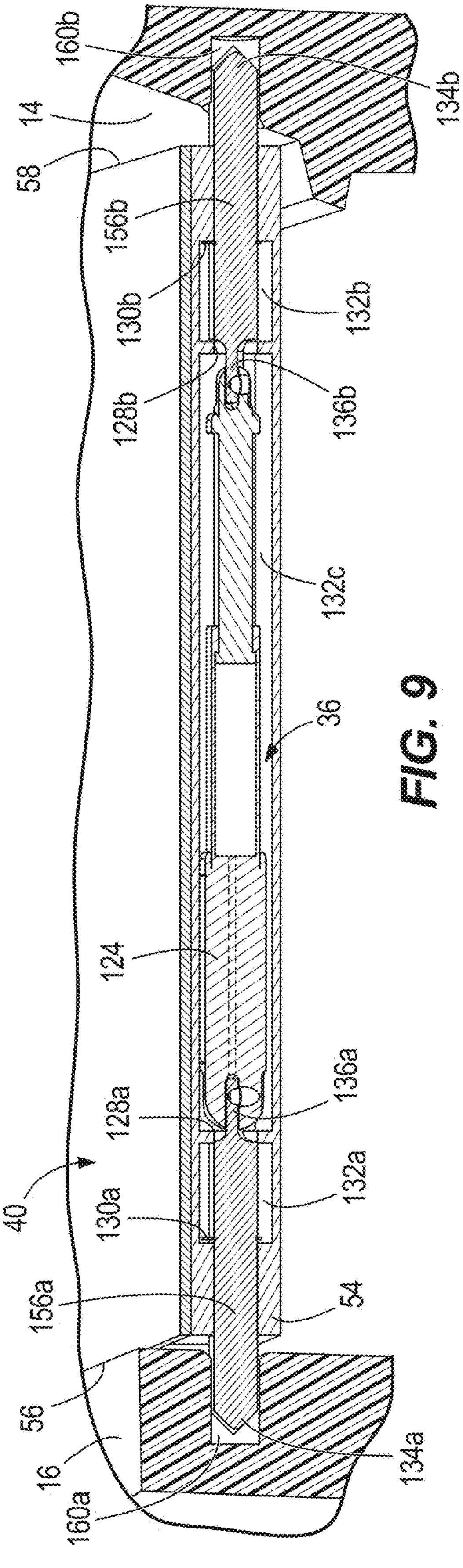
FIG. 9 is a sectional view of the lower actuator in an active position.
Figure 10:
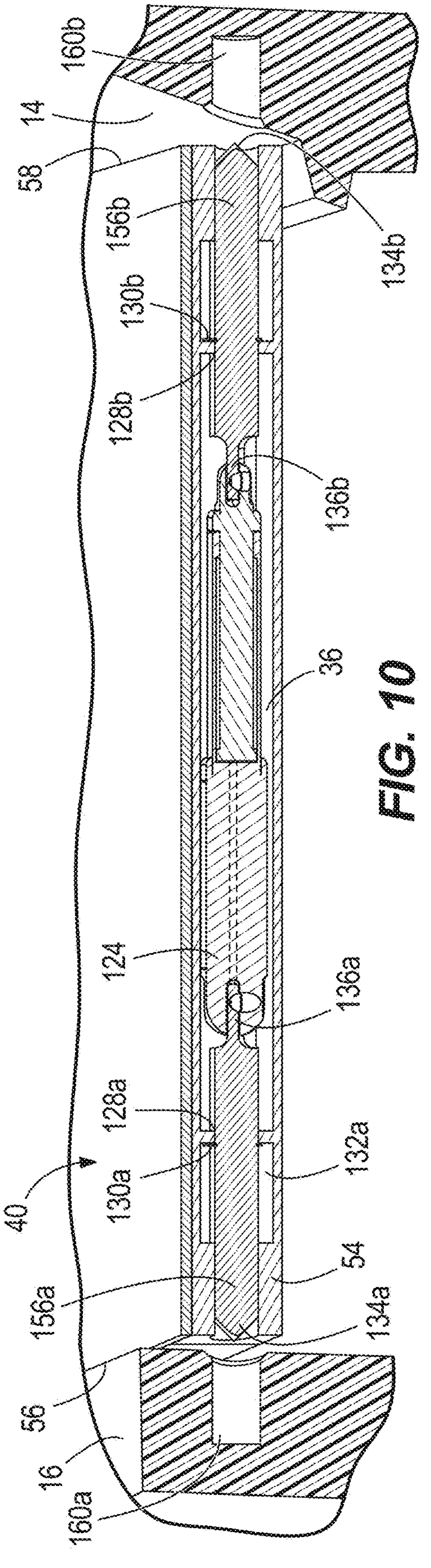
FIG. 10 is a sectional view of the lower actuator in an inactive position.

Referring to FIGS. 8-10, the auxiliary windshield 40 further includes an elongated cavity 36 within the lower end 54 which is concealed by a cover plate 190 (FIG. 3). Additionally, the hull 16 and the console 14 each include an aperture 160*a*, 160*b* positioned adjacent opposing sides of the lower end 54 when the auxiliary windshield 40 is deployed.

The elongated cavity 36 is configured to store a lower actuator 124 which is coupled on opposing ends to a first and a second pin 156*a*, 156*b*. In the illustrated example, the lower actuator 124 is a linear micro-actuator, although this configuration is not limiting. The lower actuator 124 and the first and second pins 156*a*, 156*b* are configured to couple the lower end 54 of the auxiliary windshield 40 to the console 14 and to the hull 16. The first and second pin 156*a*, 156*b* are capable of being extended or retracted laterally from the outer side 56 and the inner side 58 of the auxiliary windshield 40, into the hull 16 and the console 14, respectively. The elongated cavity 36 includes first and second dividers 126*a*, 126*b* which divide the cavity 36 into three sections: an outer section 132*a*, a center section 132*c*, and an inner section 132*b*. The first and the second sections 132*a*, 132*b* each have an aperture 128*a*, 128*b*, through which the first and the second pin 156*a*, 156*b* are configured to extend. The aperture 128*a* extends from the outer side 56 of the lower end 54 to the first divider 126*a*. The aperture 128*b* extends from the inner side 58 of the lower end 54 to the second divider 126*b*.

Each of the pins 156*a*, 156*b* have a first end 134*a*, 134*b*, a second end 136*a*, 136*b* and a snap ring 130*a*, 130*b*. The first end 134*a* of the first pin 156*a* is stowed within the outer section 132*a* of the elongated cavity 36 and configured to extend and retract laterally from the outer side 56 of the auxiliary windshield 40 into the aperture 160*a* of the hull 16. The first end 134*b* of the second pin 156*b* is stowed within the inner section 132*b* of the elongated cavity 36 and configured to extend and retract laterally from the inner side 58 of the auxiliary windshield 40 into the aperture 160*b* of the console 14. The snap ring 130*a* is secured around the first pin 156*a* within the outer section 132*a* of the elongated cavity 36, and the snap ring 130*b* is secured around the second pin 156*b* within the inner section 132*b*. The second end 136*a* of the first pin 156*a* and the second end 136*b* of the second pin 156*b* are coupled to opposing ends of the lower actuator 124 within the center section 132*c* of the elongated cavity 36.

As described above, and best illustrated in FIGS. 5-6, the auxiliary windshield 40 is movable between the deployed position (FIG. 5) and the stowed position (FIG. 6). The upper actuator 74 can be extended or retracted to move the auxiliary windshield 40 into and between the stowed and the deployed position via the pivot assembly 72. The lower actuator 124 is moveable into an active position which engages the lower end of the auxiliary windshield 40 with the console and with the hull, and an inactive position (FIG. 10) which disengages the lower end 54 of the auxiliary windshield 40 from the console 14 and the hull 16.

The upper actuator 74 and lower actuator 124 are controlled by one or more user input devices 200, illustrated in FIGS. 5-6. The user input device 200 is configured to present the user with the ability to deploy or retract at least one of the port and starboard side auxiliary windshields 40. The user input device 200 can include manually operable electro-mechanical switches or a touch screen located within the vessel 10 and communicatively connected by wired or wireless link to the upper actuator 74 and lower actuator 124. In one example, the user input device 200 includes an upper actuator switch 210 and a lower actuator switch 220, each movable into a first and second position. Actuation of the upper actuator switch 210 into the first or the second position causes the upper actuator 74 to extend or retract, pivoting the auxiliary windshield 40 into the stowed or deployed position, respectively. Actuation of the lower actuator switch 220 into the first or second position causes the lower actuator 124 to extend or retract, moving the lower actuator 124 into the active or inactive position, respectively. In an alternative example, the user input device 200 has one main switch, which is movable into a first and a second position. Actuation of the main switch into the first position causes the upper actuator 74 to retract and move the auxiliary windshield 40 into the deployed position, and then causes the lower actuator 124 to extend, moving the lower actuator 124 into the active position. Actuation of the main switch into the second position causes the lower actuator 124 to retract and move the lower actuator into the inactive position, and then extends the upper actuator 74, moving the auxiliary windshield 40 into the stowed position. Alternative user input devices can be used, including those which allow a user to move the auxiliary windshield 40 into a position between a stowed and deployed position.

In a stowed position, as illustrated in FIG. 6, the upper actuator 74 is extended, such that the actuation arm 82 extends from the body 60 and exerts a rotational force onto the rocker arm 76 via the heim joint 86. The rotational force holds the linkage arm 88 in place against the pivot bracket 62, such that the elongated body 104 closes the open end 96 of the actuator housing 44 and the auxiliary windshield 40 is retained within the recess 42. Optionally, in this position, the lower actuator 124 is moved in the active position, wherein that the pins 156*a*, 156*b* are extended from the elongated cavity 36 and into engagement with the cover 34 along sides of the recess 42 so as to retain the auxiliary windshield 40 in the stowed position. In this embodiment, the lower actuator 124 is moved from the active position to the inactive position to facilitate subsequent movement of the upper actuator 74 into the retracted position so as to deploy the auxiliary windshield 40, as described below.

In use, to deploy the auxiliary windshield 40, the user moves the upper actuator switch 210 into the first position, which causes the lower actuator 124 to move into the inactive position and the upper actuator 74 to retract the actuation arm 82 toward the body 60, which exerts a pulling force on the rocker arm 76 via the heim joint 86. The rocker arm 76 is rotated about the boss 84 in a clockwise direction, which exerts a pulling force on the pivot bracket 62 via the linkage arm 88. The pivot bracket 62 is rotated clockwise about the diagonal pivot axis 100, which causes the auxiliary windshield 40 to pivot into the deployed position while the curved outer surface 92 remains adjacent to the window frame 98. The wiper seal 22 is positioned so that the curved outer surface 92 slides along the wiper seal 22 as the auxiliary windshield is pivoted, maintaining a weathertight barrier. When deployed, the auxiliary windshield 40 is angled longitudinally toward the stern 18, such that the lower end 55 is positioned closer to the bow 20, as illustrated in FIGS. 1-2. To move the auxiliary windshield 40 from the deployed position into the stowed position, the user moves the upper actuator switch 210 into the second position, which causes the upper actuator 74 to extend the actuation arm 82, which exerts a pushing force on the rocker arm 76 via the heim joint 86. The rocker arm 76 is rotated about the boss 84 in a counterclockwise direction, which exerts a pushing force on the pivot bracket 62 via the linkage arm 88. The pivot bracket 62 is rotated counterclockwise about the diagonal pivot axis 100, which causes the auxiliary windshield 40 to pivot into the stowed position while the curved outer surface 92 remains adjacent to the window frame 98. Thereafter the lower actuator 124 is moved into the active position to retain the auxiliary windshield 40 in the stowed position, as described above.

In the inactive position, as illustrated in FIG. 10, the lower actuator 124 is held in place via the pins 156*a*, 156*b* and the respective snap rings 130*a*, 130*b* abutting the respective dividers 126*a*, 126*b*. Extension and retraction of the lower actuator 124 results in movement of the pins 156*a*, 156*b* asynchronously, insofar as the lower actuator 124 is held in suspension solely by said pins 156*a*, 156*b*. Upon initiation, the lower actuator 124 exerts an outward force on one of the pins 156*a*, 156*b*, until the respective snap ring 130*a*, 130*b* prevents further movement of said pin. The lower actuator 124 continues to extend, exerting a force in the opposite direction and moving the remaining pin into its intended position. To move into the active position, as illustrated in FIG. 9, the user moves the lower actuation switch 220 into the first position, which causes the lower actuator 124 to extend, which forces the pins 156*a*, 156*b* outward until the respective first ends 134*a*, 134*b* are positioned within the respective apertures 160*a*, 160*b* and the respective snap rings 130*a*, 130*b* abut opposite ends of the elongated cavity 36. To move into the inactive position, as illustrated in FIG. 10, the user moves the lower actuation switch 220 into the second position, which causes the lower actuator 124 to retract, which exerts a pulling force and moves the pins 156*a*, 156*b* inward until the respective snap rings 130*a*, 130*b* abut the respective dividers 126*a*, 126*b* such that the pins 156*a*, 156*b* are stowed fully within the lower end 54 of the auxiliary windshield 40.

Furthermore, the wind doors 64 are movable into and between a retracted positioned and an extended position in which the wind doors 64 span the lower portion of the port and starboard gaps 35. As illustrated in FIGS. 1-2, the auxiliary windshields 40 in the deployed position in combination with the wind doors 64 in the extended position provides a weathertight barrier for the helm and the gaps 35 extending from the starboard side 26 to the port side 28 and from the deck 24 to the cover 34. In the illustrated example, the wind doors 64 are manually pivoted into and between the retracted position and extended position, however it is presently contemplated that an actuator such as an electric motor could be provided for automatically moving the wind doors 64 based on a user input via for example the noted user input device 200.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples which occur to those skilled in the art. Such other examples are intended to be within the scope of the claims if they have features or structural elements which do not differ from the literal language of the claims, or if they include equivalent features or structural elements with insubstantial differences from the literal languages of the claims.

What is claimed is:

1. A marine vessel comprising:
- a hull having a starboard side and a port side;
- a console having a helm and a console windshield that shields the helm from wind;
- a cover extending over the helm; and
- an auxiliary windshield coupled to the cover, the auxiliary windshield being pivotable relative to the cover into a stowed position in which the auxiliary windshield is stowed in the cover and into a deployed position in which the auxiliary windshield extends downwardly from the cover into a gap between the console and one of the starboard side and the port side.

2. The marine vessel according to claim 1, wherein in the stowed position the auxiliary windshield is nested in the cover.

3. The marine vessel according to claim 1, wherein in the deployed position the auxiliary windshield and the console windshield together provide a weathertight barrier across the console and the gap between the console and the one of the starboard side and the port side.

4. The marine vessel according to claim 1, wherein in the stowed position the auxiliary windshield is nested in a recess in the cover.

5. The marine vessel according to claim 1, further comprising an actuator configured to move the auxiliary windshield into the stowed position and into the deployed position.

6. A marine vessel comprising:
- a hull having a starboard side and a port side;
- a console having a helm and a console windshield that shields the helm from wind;
- a cover extending over the helm;
- an auxiliary windshield coupled to the cover, the auxiliary windshield being movable relative to the cover into a stowed position in which the auxiliary windshield is stowed in the cover and into a deployed position in which the auxiliary windshield extends downwardly from the cover into a gap between the console and one of the starboard side and the port side, wherein in the deployed position the auxiliary windshield spans an upper portion of the gap; and
- a wind door that is movable into and between a retracted position and an extended position in which the wind door spans a lower portion of the gap.

7. The marine vessel according to claim 6, wherein the wind door is pivotably coupled to one of the hull and the console.

8. The marine vessel according to claim 6, wherein moving the auxiliary windshield into the deployed position and moving the wind door into the extended position provides a weathertight barrier across the gap between the console, the cover, and a deck on the hull.

9. The marine vessel according to claim 6, wherein the auxiliary windshield is one of a starboard auxiliary windshield and a port auxiliary windshield, and wherein movement of each of the starboard auxiliary windshield and the port auxiliary windshield into the deployed position provides a weathertight barrier extending from the starboard side to the port side.

10. The marine vessel according to claim 9, wherein the gap is one of a starboard gap and a port gap, and wherein in the deployed position, the starboard auxiliary windshield and the port auxiliary windshield span an upper portion of the starboard gap and the port gap, respectively, and further comprising a starboard wind door and a port wind door which are each movable into and between a retracted position and an extended position in which the starboard wind door and the port wind doors span a lower portion of the starboard gap and the port gap, respectively, so that together the console, the starboard auxiliary windshield, the port auxiliary windshield, the starboard wind door, and the port wind door provide a weathertight barrier extending from the starboard side to the port side and from a deck on the hull to the cover.

11. The marine vessel according to claim 1, further comprising a pivot assembly that pivotably couples an upper end of the auxiliary windshield to the cover along a pivot axis.

12. The marine vessel according to claim 11, wherein the pivot assembly includes an upper actuator configured to pivot the auxiliary windshield into the stowed position and into the deployed position.

13. The marine vessel according to claim 12, wherein the upper actuator includes a linear actuator.

14. The marine vessel according to claim 13, wherein the upper actuator is coupled to the auxiliary windshield by a rocker arm.

15. The marine vessel according to claim 13, wherein the pivot assembly includes a pivot bracket that is fixedly coupled to the auxiliary windshield and wherein extension and retraction of the linear actuator pivots the pivot bracket and the auxiliary windshield about the pivot axis.

16. The marine vessel according to claim 15, wherein the cover includes a window frame and wherein the pivot bracket includes a curved outer surface that remains adjacent to the window frame as the auxiliary windshield is pivoted about the pivot axis into and between the stowed position and the deployed position.

17. The marine vessel according to claim 16, further comprising a wiper seal on the window frame, wherein the curved outer surface slides along the wiper seal as the auxiliary windshield is pivoted about the pivot axis.

18. The marine vessel according to claim 12, further comprising a lower actuator that couples a lower end of the auxiliary windshield to the console and to the hull in the deployed position.

19. The marine vessel according to claim 18, wherein the lower actuator includes a linear actuator that is retained in the lower end of the auxiliary windshield, the lower actuator being movable into an active position which engages the lower end of the auxiliary windshield with the console and with the hull, and an inactive position which disengages the lower end of the auxiliary windshield from the console and the hull.

20. A convertible windshield apparatus for a marine vessel, the convertible windshield apparatus comprising:
- a cover having a recess,
- an auxiliary windshield being pivotable into and between a stowed position in which the auxiliary windshield is nested in the recess and a deployed position in which the auxiliary windshield is located at least partially out of the recess, and
- a pivot assembly that pivotably couples the auxiliary windshield to the cover along a pivot axis,
- wherein the pivot assembly includes an actuator and a pivot bracket that is fixedly coupled to the auxiliary windshield, and wherein the actuator pivots the pivot bracket and auxiliary windshield about the pivot axis.

21. The convertible windshield apparatus according to claim 20, further comprising a rocker arm that pivotably couples the actuator to the pivot bracket.

22. The convertible windshield apparatus according to claim 21, wherein the actuator includes a linear actuator.

23. The convertible windshield apparatus according to claim 21, wherein the cover includes a window frame and wherein the pivot bracket has a curved outer surface that remains adjacent to the window frame as the auxiliary windshield is pivoted about the pivot axis into and between the stowed position and the deployed position.

24. The convertible windshield apparatus according to claim 21, wherein the actuator is an upper actuator and further comprising a lower actuator for coupling a lower end of the auxiliary windshield to the marine vessel in the deployed position.

25. A marine vessel comprising:

a hull having a starboard side and a port side;

a console having a helm and a console windshield that shields the helm from wind;

a cover extending over the helm;

a starboard auxiliary windshield coupled to the cover, the starboard auxiliary windshield being movable relative to the cover into a stowed position in which the starboard auxiliary windshield is stowed in the cover and into a deployed position in which the starboard auxiliary windshield extends downwardly from the cover into a starboard gap between the console and the starboard side, wherein in the deployed position the starboard auxiliary windshield spans an upper portion of the starboard gap; and a port auxiliary windshield coupled to the cover, the port auxiliary windshield being movable relative to the cover into a stowed position in which the port auxiliary windshield is stowed in the cover and into a deployed position in which the port auxiliary windshield extends downwardly from the cover into a port gap between the console and the port side, wherein in the deployed position the port auxiliary windshield spans an upper portion of the port gap, wherein together with the console windshield, the starboard auxiliary windshield and the port auxiliary windshield provide a weathertight barrier extending from the starboard side to the port side.

26. The marine vessel according to claim 25, further comprising a starboard wind door and a port wind door that are each movable into and between a retracted position and an extended position in which the starboard wind door and the port wind door span a lower portion of the starboard gap and the port gap, respectively, so that together the console, the starboard auxiliary windshield, the port auxiliary windshield, the starboard wind door, and the port wind door provide a weathertight barrier extending from the starboard side to the port side and from a deck on the hull to the cover.

* * * * *